United States Patent [19]

Lemos

[11] 4,011,756

[45] Mar. 15, 1977

[54] METALLIC HOT WIRE ANEMOMETER
[75] Inventor: Fred R. Lemos, San Jose, Calif.
[73] Assignee: The United States of America as represented by the Administrator of the National Aeronautics and Space Administration, Washington, D.C.
[22] Filed: Sept. 5, 1975
[21] Appl. No.: 610,802
[52] U.S. Cl. .................................. 73/204; 338/28
[51] Int. Cl.² .......................................... G01F 1/68
[58] Field of Search ................ 73/204; 338/28, 229
[56] References Cited

UNITED STATES PATENTS

| | | | |
|---|---|---|---|
| 2,870,305 | 1/1959 | Ling | 73/204 X |
| 2,888,655 | 5/1959 | Lawler | 338/28 |
| 2,957,153 | 10/1960 | Greenberg | 338/28 |
| 3,683,692 | 8/1972 | LaFitte | 73/204 |

OTHER PUBLICATIONS

Flow Corporation Bulletin, pp. 1 and 16 (back cover).

Primary Examiner—Herbert Goldstein
Attorney, Agent, or Firm—Darrell G. Brekke; John R. Manning

[57] ABSTRACT

A hot wire anemometer having a body formed of heat resistant metal such as an alloy very high in nickel content. The body supports a probe wire in a moving air stream and is mechanically arranged so that the probe wire is disposed in a V groove in the body, which V groove contains a high temperature ceramic adhesive that partially encompasses the downstream side of the probe wire. Mechanical and electrical connection to the probe wire is achieved through conductive support rods that are constructed of the same high temperature metal, insulation between the body and the conductor rods being provided by a coating of an oxide of the same material which coating is formed in situ. Not only does the oxide coating insulate the conductor rods from the body but mechanically fixes the conductors within the body and maintains its integrity at elevated temperatures to which a hot wire anemometer is typically subjected. A method for forming the anemometer structure which employs conventional machining procedures combined in a novel sequence.

9 Claims, 8 Drawing Figures

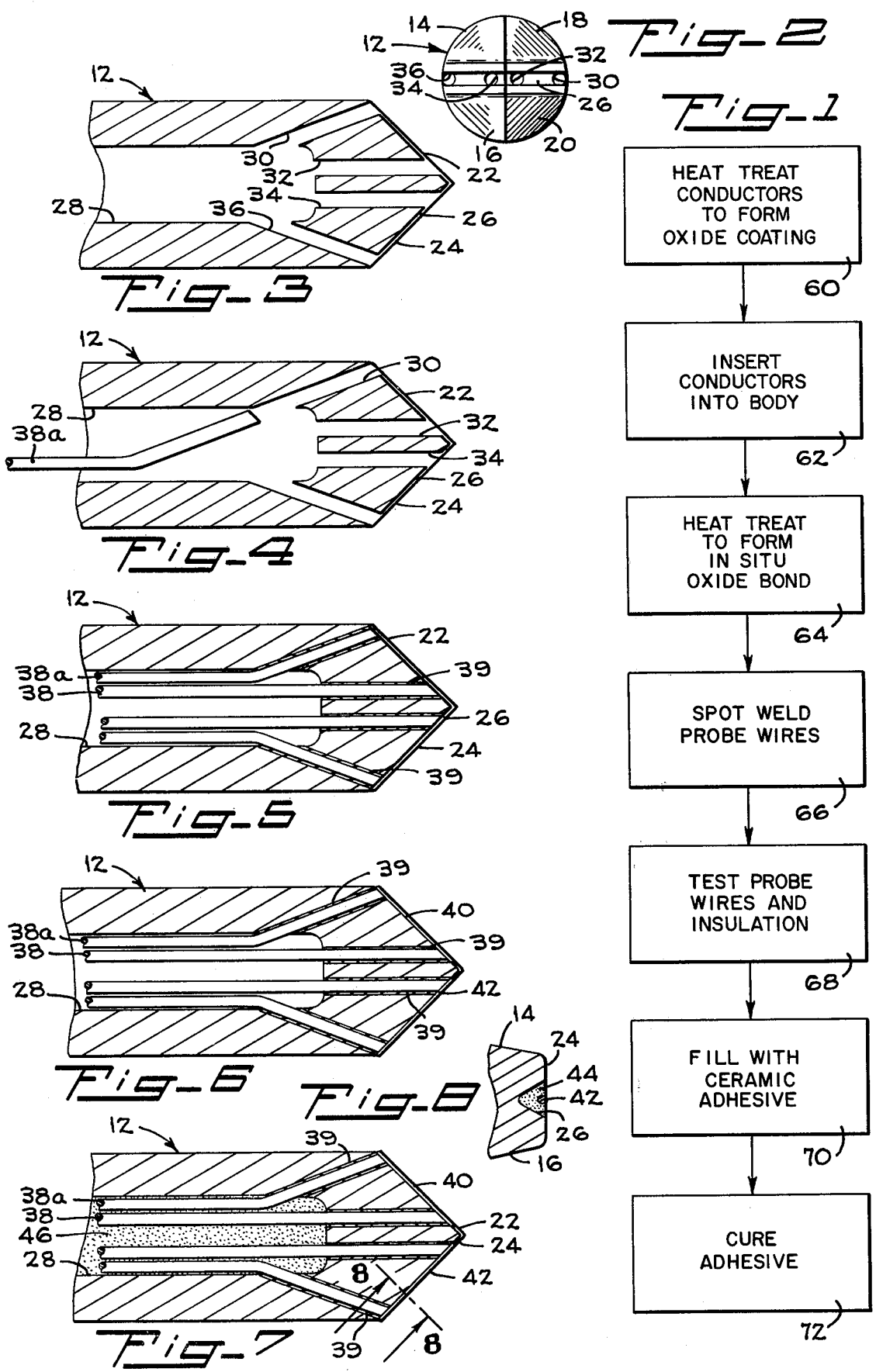

METALLIC HOT WIRE ANEMOMETER

The invention described herein was made by an employee of the United States Government, and may be manufactured and used by or for the government for governmental purposes without payment of any royalties thereon or therefor.

BACKGROUND OF THE INVENTION

1. Field of the Invention

This invention relates to a hot wire anemometer and more particularly to a hot wire anemometer of the type employed in measuring air velocity in a high speed wind tunnel.

2. Description of the Prior Art

Hot wire anemometers have been embodied by providing two spaced apart conductive support rods between which a thin wire is supported. This type of anemometer is unsatisfactory in a high speed wind tunnel because the wire is typically operated red hot, a condition at which the strength of the wire is impaired particularly in the presence of a fast moving wind stream. The wire either totally ruptures or vibrates whereby unsatisfactory electrical outputs are obtained. Another form of hot wire anemometer employs a thin conductive coating deposited on the tip of a probe. Although mechanically stable during operation, an anemometer employing a thin film cannot carry sufficient current, so that the range and accuracy of the measurements is severely impaired.

SUMMARY OF THE INVENTION

According to the present invention a metallic body is machined into the desired shape, for example a generally wedge shape having a relatively narrow edge face disposed in the wind stream. Cylindric holes are machined in the body and terminate at opposite ends of the edge face so that a hot wire can be physically and electrically connected between the exposed ends of the conductive rods. The edge face is preferably formed with a V groove in which the probe wire resides, the V groove being filled with a curable ceramic adhesive so as to support the probe wire throughout its length and expose only the portion thereof that faces the oncoming wind stream. Electrical isolation between the conductor rods and the body is achieved by subjecting the wires and then the body to a heat treatment in an oxygen containing atmosphere in order to form in situ an oxide coating on the interior walls of the holes and the exterior surface of the rods. Not only does such oxide coating provide electrical insulation throughout all temperatures of operation of the device, but it mechanically fixes the conductive rods within the body.

An object of the invention is to provide a hot wire anemometer capable of extremely high temperature operation. Achievement of this object is important in modern day wind tunnels employed to test supersonic craft and is attained in accordance with the present invention by forming the structure of a metal, such as nickel, that has excellent strength and integrity at elevated temperatures.

Because metal is employed in fabricating the invention it is essential to afford insulation between the electrically active parts of the structure and the support parts of the structure. It is an object to provide such insulation that is operative at extremely high temperatures in an economical fashion. This object is achieved by first mechanically forming the elements of the device and then by subjecting the elements to heat treatment in an oxygen containing atmosphere to form in situ an oxide coating which retains its insulative character throughout all temperatures of operation of the device.

A further object is to provide a hot wire anemometer that retains its structural integrity in the presence of high temperatures and high air velocities. This object is achieved by fixing the conductors within the housing by means of an oxide coating which is formed in situ. Such coating retains a firm mechanical bond between the conductors and the housing notwithstanding the presence of high temperatures and high air velocities.

A further object is to provide a hot wire anemometer in which the probe wire is mechanically supported throughout its length. Achievement of this object is particularly important in high speed wind tunnels because the probe wire typically runs at a red hot condition, a condition in which its physical strength is impaired particularly in the presence of a fast moving air stream. This object is achieved by forming on a forward edge face of the probe body a V groove into which the probe wire is installed and by filling the V groove with a ceramic adhesive which can be cured to form a hard, insulative material that maintains these characteristics even at elevated temperatures.

The foregoing together with other objects, features and advantages will be more apparent after referring to the following specification and the accompanying drawing.

BRIEF DESCRIPTION OF THE DRAWING

FIG. 1 is a block diagram showing the sequence of steps in performing the method of the invention to produce the article of manufacture of the invention.

FIG. 2 is an end view of a body formed in practicing the method of the invention.

FIG. 3 is a longitudinally cross-sectional view of an anemometer body.

FIG. 4 is a view similar to FIG. 3 shown with the probe conductor rods in place.

FIG. 5 is a view similar to FIG. 4 showing the probe conductor rods immovably fixed within the body.

FIG. 6 is a view similar to FIG. 5 showing the probe wires secured to the outer ends of the conductive rods.

FIG. 7 is a view similar to FIG. 6 showing the completed probe with necessary parts encapsulated.

FIG. 8 is a fragmentary cross-sectional view at enlarged scale and taken along line 8—8 of FIG. 7.

DESCRIPTION OF THE PREFERRED EMBODIMENT

Referring more particularly to the drawing reference numeral 12 identifies the main body of an anemometer embodying the invention. As seen in FIG. 2 body 12 has a circular or cylindrical cross section, the forward end of which, i.e. the right hand end as viewed in FIG. 3, is ground to a tapered streamlined shape such that a rapidly moving fluid such as air will flow relatively smoothly over the body. Body 12 is formed of any suitable material that has adequate strength at elevated temperatures at which hot wire anemometers typically operate. A meterial that has been found suitable is nickel having a purity of about 99.5%.

Body 12, as viewed in FIG. 2, has a left hand pair of tapered surfaces 14 and 16 and a right hand pair of tapered surfaces 18 and 20. The respective pairs of surfaces converge toward the forward end of the body to define edge faces 22 and 24, the body being so configured that the edge faces diverge rearward, i.e. leftward as viewed in FIG. 3, of body 12. Body 12 is ground or otherwise machined to form V grooves 26 in edge faces 22 and 24.

After the external surface of body 12 is formed or machined as described above, the internal configuration is formed. Concentric with the external cylindric surface of probe 12 is an internal bore 28. Four cylindric holes 30, 32, 34 and 36 are machined in body 12 to communicate with bore 28 and the respective opposite extremities of edge faces 22 and 24. More particularly cylindric hole 30 extends obliquely from bore 28 to the outer extremity of edge face 22; cylindric hole 32 extends axially to the inner extremity of edge face 22; cylindric hole 34 extends axially to the inner extremity of edge face 24; and cylindric hole 36 extends obliquely to the outer extremity of edge face 24. To facilitate final assembly, it is desirable that the inside diameter of bore 28 be equal to or greater than the radial offset between the extremities of obliquely oriented cylindric holes 30 and 36. Bore 28 and the cylindric holes can be advantageously formed by electro discharge machining (EDM) because of the hardness of the material of which body 12 is formed and because of the precision required in forming the cylindric holes.

The next step in forming a probe according to the invention is to provide cylindric conductors indicated at 38 in FIG. 4 for installation within the cylindric holes 30–36. Conductor rods 38 are formed of cylindric wire that has good conductivity and high temperature strength. For example, the same substantially pure nickel material as used in forming body 12 can be employed. In one anemometer structure designed according to the present invention conductor rods 38 are formed of nickel material having a cylindric cross-sectional shape and an outside diameter of about 0.008 inches. The conductor rods are cut to approximate length and the wires to be installed into obliquely oriented cylindric holes 30 and 36 are preliminarily bent to the position shown in FIG. 2 at 38a. Thereafter the conductor rods are heat treated in an oxygen containing environment at about 900° Centigrade for about two hours. The consequence of such treatment is the formation on the exterior surface of the conductor rods of an oxide layer having a thickness of about 0.0005 inch, which oxide coating is a good electrical insulator and is firmly and intimately bonded to the surface of the conductor rod. The diameter of cylindric holes 30–36 is established with respect to the outer diameter of the conductor rods so as to afford a slip fit between the conductor rods and the cylindric holes. Thus the conductor rods after formation of the insulative oxide coating can be inserted into the cylindric holes to a position depicted in FIG. 4. Because the diameter of bore 28 equals or exceeds the radial offset of bent rods 38a, the rods can be inserted without distorting the rods or adversely affecting the oxide coating thereon.

Thereafter the entire subassembly is heat treated in an oxygen containing chamber at about 900° C for about two hours. This causes in situ formation on the surfaces of cylindric holes 30, 32, 34 and 36 of an oxide coating, which oxide coating performs the dual functions of providing additional insulation between the body 12 and conductor rod 38 and bonding with the oxide coating previously formed on the conductive rods to fix the conductive rods within the body. The latter condition is depicted in FIG. 5, the oxide coating being indicated at 39.

The outer, i.e. right hand, ends of the conductor rods are accessible from V grooves 26 in edge faces 22 and 24. To such ends are fixed probe wires 40 and 42, probe wire 40 extending in the V groove in edge face 22 and probe wire 42 being disposed in the V groove and edge face 24. Spot welding the probe wires to the rod ends affords the requisite mechanical and electrical connection. Probe wires 40 and 42 are the active portions of the completed anemometer and can be constructed of any suitable conductive wire that retains its strength at high temperatures. For example, probe wire constructed of an alloy of 90% plantinum and 10% rhodium and having a diameter of about 10 microns (1 micron = $\mu$ 1 × 10$^{-6}$ meters). Probe wires 40 and 42 are preferably installed (see FIG. 8) so that they are tangent to and slightly outward of edge faces 22 and 24. In an exemplary structure designed according to the present invention, edge faces 22 and 24 have a width of about 0.005 inch and V groove 26 has a width of about 0.0023 inch and a depth of about 0.002 inch; these dimensions afford adequate strength with minimal disturbance of the flow of fluid over the device.

Next V grooves 26 are filled or potted with a high temperature ceramic adhesive 44 in order to afford mechanical support to the probe wire. Exemplifying a suitable ceramic adhesive is a product sold under the tradename Ceramabond 503 by Aremco Products Inc. of Briarcliff Manor, N.Y. Such material is marketed in a paste which can be applied and then heat treated by curing in a furnace at about 250° for four hours. It is important in installing the adhesive within the V groove to expose the upstream i.e. right hand, surface area of the probe wire because that is the active portion of the hot wire anemometer of this invention.

Finally bore 28 is potted with a suitable sealant 46 which seals the conductor rods and provides mechanical support to them. A suitable sealant material is sold under the tradename Cerama-Dip 538 by Aremco Products Inc. Thus the hot wire anemometer is ready for electrical connection and installation into a wind tunnel or like environment where the velocity of a rapidly moving airstream is to be measured.

In operation one or both of the probe wires is supplied with a current to raise the temperature of the wire. The probe wire, through connection to conductor rods 38 is electrically incorporated into a bridge circuit. When the headed, current carrying wire is subjected to a rapidly moving airstream, its conductivity changes and the amount of the conductivity change is readily ascertained by conventional techniques associated with the bridge circuitry. Because the wire is supported throughout its length and because body 12 is constructed of material having good strength at high temperatures, an anemometer incorporating the invention can be operated in an extremely high temperature for improved accuracy in linearity of response. Firm support of probe wires 40 and 42 throughout their lengths eliminates mechanical movements or fluctuations which if permitted to occur cause corresponding electrical abberations.

The method of forming the structure according to the invention will now be recapitulated in conjunction with the block diagram of FIG. 1. After body 1 is shaped as shown in FIG. 2, the conductor rods 38 are cut to approximate size and some of the conductor rods 38a are bent to conform to the oblique orientation of cylindric holes 30 and 36. Next the rods are placed in an oxygen containing atmosphere and baked for about two hours at about 900° C, the baking step being identified at 60. The baking step forms an insulative coating on the surfaces of the rods. The coated conductive rods are then inserted into respective cylindric holes 30–36 in body 12, a close fit being achieved because of the precise forming of the cylindric holes by an EDM procedure. Insertion of conductor rods into obliquely extending cylindrical holes 30 and 36 is facilitated because the conductive rods are bent before the baking step mentioned above and because the inner diameter of bore 28 is sufficiently large to afford insertion of such wires. After completion of the insertion step, identified at 62 in FIG. 1, the elements are positioned as shown in FIG. 4. Thereafter the partially assembled structure is again baked in an atmosphere containing oxygen at a temperature of about 900° C for about two hours or so, said baking step being identified at 64. The consequence of this latter baking step is in situ formation of an insulated oxide coating on the interior walls of cylindric holes 30–36 which affords electrical isolation between the conductor rods and the body 12 and fixes the conductor rods within the body.

Next the probe wires 40, 42 are welded or fixed to the ends of the conductive rods in slot 26, the step of welding the probe wires being indicated at 66. The integrity of the welds and the probe wires cannot be established visually (even with a microscope). It is convenient at this stage to test the integrity of the probe wires by supplying current to associated pairs of conductor rods 38, 38a so as to pass sufficient current through each wire to heat it to a red hot condition. If the probe wires 40, 42 are in any way defective, they will fail at this stage. The testing step is indicated in FIG. 1 at 68.

Next V groove 26 is filled with a high temperature adhesive 44 in such a way that the probe wires are supported throughout their lengths but their forward surfaces are exposed. Also, a sealant 46 is introduced into bore 28 to seal the rear end of the structure and to fix the protruding end of conductor rods 30, 32, 34 and 36 in place. The last described step is indicated at 70 in FIG. 1. Finally the material in V groove 26 and bore 38 is cured and hardened by heat treating the entire body at a temperature and for a time sufficient to cure and set the adhesive. The curing step is indicated in FIG. 1 at 72.

In use the structure is supported in a wind tunnel or the like so that the longitudinal axis of the body is oriented parallel to the direction of fluid flow within the wind tunnel. The probe wires are connected to suitable electrical circuit elements through the conductor rods and the measurements can be made with accuracy and consistency. The exemplary device described hereinabove can operate at temperatures up to about 1,300°–1,400° F, because body 12 is made of a heat resistant material and because the probe wires are supported throughout their lengths. More important, because the probe wires are physically supported throughout their lengths they do not oscillate or vibrate so that the electrical readings attained therefrom are stable and are accurately correlated to the actual wind velocity through the wind tunnel.

Thus it will be seen that the present invention provides an improved hot wire anemometer supporting structure which is capable of high temperature, stable and long term operation. The method for forming the support structure can be carried out by employment of manufacturing steps, each of which per se is well known. In situ formation of an oxide coating for insulating and fixing the conductor rods within the support body assures production of a structure that possesses the requisite strength and stability at high temperatures. Although one embodiment has been shown and described it will be obvious that other adaptations and modifications can be made without departing from the true spirit and scope of the invention.

What is claimed is:

1. A hot wire anemometer for measuring air flow along a path comprising a metallic body, said body defining a narrow edge face and tapering surfaces diverging rearward from said edge face, said body defining first and second cylindric holes terminating at their outer ends at spaced apart locations in said edge face and at their other ends at a portion of the body remote from said edge face, first and second electrical conductor rods disposed in respective said holes and having distal ends accessible from said edge face, means circumscribing said conductor rods for electrically insulating said conductor rods from one another, a probe wire secured to the distal ends of said conductor rods, and means for securing said probe wire throughout its length to said edge face, said securing means partially circumscribing said wire, said securing means comprising a ceramic adhesive whereby said probe wire may be operated at a temperature at least as high as 1,300° F.

2. An anemometer according to claim 1 wherein said insulating means comprises an oxide coating formed in situ in said holes.

3. An anemometer according to claim 1 wherein said body and said conductor rods are formed of high purity nickel, and wherein said insulating means includes an oxide of nickel formed in situ.

4. An anemometer according to claim 1 wherein said ceramic adhesive is confined to the portion of said probe wire confronting said edge face so that the opposite portion of said probe wire is exposed to air flowing along said path.

5. An anemometer according to claim 4 wherein said body defines a V groove in said edge face in parallelism with said probe wire and wherein said ceramic adhesive resides within said V groove.

6. An anemometer according to claim 5 wherein said V groove has a width no greater than about one-half the width of said edge face.

7. An anemometer according to claim 1 including said remote body portion defining a bore communicating with said holes, said conductor rods extending into said bore, and means in said bore for sealing said bore and supporting said conductor rods.

8. An anemometer according to claim 7 wherein said first hole extends obliquely of said bore so that there is a radial offset between opposite ends of said first hole, said bore having a diameter at least as large as said radial offset to permit installation of said first conductor rod in said first hole without distorting said conductor rod.

9. A hot wire anemometer for measuring air flow along a path comprising a metallic body having a central axis and an outer cylindric surface concentric with said axis, said body having a forward end defining two edge faces diverging rearward from said central axis, said body defining streamlining surfaces diverging rearward from respective said edge faces, said edge faces each defining a V groove therein, each said V groove having an inner extremity adjacent said axis and an outer extremity adjacent said cylindric surface, said body defining in a region remote from said edge faces a bore substantially concentric of said axis, first and second cylindric holes extending parallel to said axis between said bore and inner extremities of respective said V grooves, third and fourth cylindric holes extending obliquely from said bore to the outer extremities of respective said V grooves, first, second, third and fourth conductor rods disposed in respective said holes, an oxide coating formed in situ in circumscribing relation to said rods for insulating said rods from said body and for fixing said rods within said body, first and second probe wires disposed in respective said V grooves and fixed to the ends of said conductors in said V grooves, a ceramic adhesive disposed in said V grooves for supporting said probe wires throughout their lengths, said ceramic adhesive being confined to the portion of said probe wires confronting said V grooves so that opposite portions of said probe wires are exposed to air flowing on said path, and means in said bore for sealing and supporting said conductor rods therein.

* * * * *